Figures 1, 2:
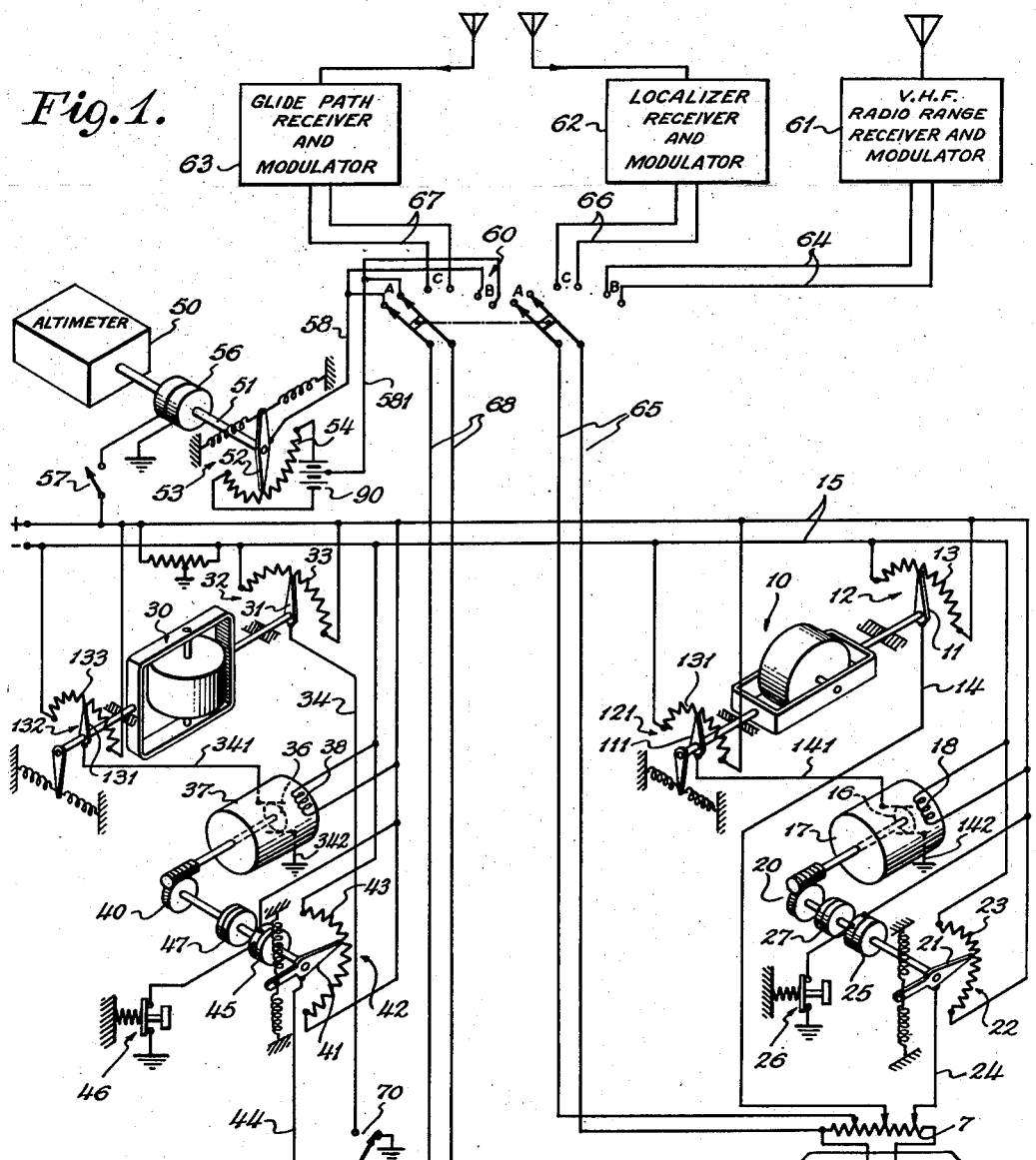

July 7, 1953 — S. KELLOGG 2ND — 2,644,941
FLYING AID FOR PILOTED AIRCRAFT
Filed Jan. 28, 1952

INVENTOR
SPENCER KELLOGG, 2ND
BY
Herbert H. Thompson
ATTORNEY.

Patented July 7, 1953

2,644,941

UNITED STATES PATENT OFFICE 2,644,941

FLYING AID FOR PILOTED AIRCRAFT

Spencer Kellogg 2nd, Glen Head, N. Y., assignor to The Sperry Corporation, a corporation of Delaware Application January 28, 1952, Serial No. 268,655

27 Claims. (Cl. 343—107)

My invention relates to craft guidance systems and has reference more particularly to a visual flying aid for manually piloted aircraft wherein there is provided an indicating instrument of the cross-pointer type, the indicating arms of which are moved by signals from various measurements of flight attitude and position of the craft. An indicating instrument of the type employed in this invention and a system for moving the indicating arms thereof is shown in detail in my copending application Serial No. 15,064 for Flight Indicating System for Dirigible Craft, filed March 16, 1948, and which matured into U. S. Patent No. 2,613,350 on October 7, 1952.

The present application is a continuation-in-part of application Serial No. 107,592 for a Visual Flying Aid for Manually Piloted Aircraft, filed July 29, 1949, and now abandoned.

The above-mentioned application shows a cross-pointer meter the indicating arms of which are controlled by signals from a directional reference instrument, such as a magnetic compass, and a bank and pitch indicating instrument, such as a vertical gyroscope. The arms are further controlled by signals from various types of radio craft guidance systems, such as, for example, a V. H. F. (very high frequency) 2-course radio range, a V. H. F. omnirange or from a radio I. L. S. (instrument landing system). According to the aforesaid application, the above-mentioned signals are combined in such a manner as to cause the indication of the meter to form a predetermined pattern on the face of the meter under correct flight attitude conditions. It will be understood that the term "flight attitude" as herein employed, is used in its broad sense to include heading as well as roll and pitch attitudes and also displacements of the craft laterally from a radio beam or radio defined ground track. That is to say, if the craft is in a correct attitude relative to a radio ground track, such as one of the above noted radio ranges, the pointers will be centered or will read "zero." Furthermore, if the craft be off the course or in an incorrect attitude and the pilot has accordingly changed or corrected the attitude of the craft in a direction and in an amount to bring the craft back on the desired attitude or radio course, the indicating arms of the cross-pointer meter will return to and remain in the centered position.

My present invention applies to an instrument which may, for example, provide an indication of the same type, wherein the pilot adjusts the craft's attitude in order to hold the indicating arms of the cross-pointer meter in their center or zero position, causing the craft smoothly to approach the desired course without overshoot or hunting. In the instrument of the above-mentioned application, the bank angle is the controlling function and is adjusted or controlled by the pilot, the rate of turn of the craft being inferred from the bank angle. However, by my present invention I measure the rate of turn directly by a rate of turn responsive device and not by inference from the bank angle; and by integration of the rate of turn signal produced by the rate of turn determining device I provide a signal which is proportional to the angular displacement of the craft from an initial predetermined attitude (heading). Both signals are algebraically combined with or without a radio signal from one of the above-mentioned radio beams and applied through suitable summing circuits to move the indicating arms of the cross-pointer indicator. In this way no other directional reference is required. However, if the pilot for any reason wishes to change his course and heading, he does so conviently by referring to the craft's magnetic compass, or to a rate of turn indicator and by time measurements; and as soon as he has obtained his desired new course and heading, he wipes out or zeros the displacement signal produced by the integrating device thereby reconditioning the indicating meter.

It is therefore the principal object of the present invention to provide a flying aid primarily for manually piloted aircraft in which case it comprises an indicator wherein its indication is controlled by signals proportional to rate of turn of the craft and the time integral of rate of turn or angular displacement of the craft from a predetermined flight attitude.

It is a further object of the present invention to provide a flying aid primarily for manually piloted aircraft in which case it comprises an indicator wherein the indication thereof is controlled from signals proportional to displacement of the craft from a predetermined radio ground path and also from signals proportional to the rate of turn of the craft and the time integral of rate of turn or angle displacement of the craft from a predetermined flight attitude.

Other objects and features of the present invention not at this time more particularly enumerated will become apparent from the following detailed description thereof when considered with respect to the following drawings, wherein Fig. 1 is a schematic view of a preferred embodiment of my invention; and Fig. 2 is a diagram of a typical flight path when using the teachings of my invention.

In the system shown in Fig. 1 of the drawings the indicating instrument is illustrated by way of example as a meter 1 having a pair of indicating members or arms 2 and 3 which cooperatively form a predetermined, preferably symmetrical pattern in the face of the meter 1 under correct flight attitude conditions of the craft. The meter 1 is provided with a reference index 4 preferably at the center of its face and the vertical and horizontal indicating members or arms 2 and 3 intersect at this index when they are in their normal position. Movement of either or both of the arms relative to the reference index 4 will indicate to the pilot the need for correction of the craft's flight attitude. For example, as the indicating arm 2 moves in response to a signal, away from reference 4, to be hereinafter more fully described, the pilot must change the attitude of the craft in azimuth to cause the arm to realign itself with the reference index 4. Similarly, if the horizontal indicating arm 3 moves to a position away from reference 4 the pilot must adjust the craft's attitude in pitch to realign the arm with the reference index 4. By occasional adjusting of the craft's attitude to thereby center or "zero" the indicating arms of the meter, the pilot will maintain a predetermined flight course without reference to any other flight instruments. Both vertical indicating arm 2 and horizontal indicating arm 3 are moved by suitable signal responsive devices 5 and 6 respectively. Such devices may take the form of voltage indicating meters such as for example galvanometers. Signal voltages are supplied to the signal responsive devices 5 and 6 through suitable signal combining means illustrated in the present embodiment of the invention as summing circuits 7 and 8. These circuits comprise a resistance element across which the various signals are algebraically combined to produce a movement of the indicating arms by the signal responsive devices.

It is to be understood, however, that my invention is not limited to any particular type of indicating instrument such as the one described herein and illustrated in the drawings for exemplary purposes. Any and all forms of suitable indicators may be used. These may, for example, be of the visual type or of the sonic type such as meters, cathode ray tubes, audible annunciators and the like. In all cases, the resultant of all the operating signals will produce an operation of the indicator which is readily interpreted by the pilot. The electron beam of the cathode ray tube may produce a pattern on the face of the tube which is modulated or displaced in accordance with the signals and in the case of an audible annunciator tones and tone intensities may be controlled in accordance with these signals.

As stated above, the indicating arms of the cross-pointer meter 1 are controlled from signals proportional to the rate of turn of the craft and the time integral of the rate of turn or angular displacement of the craft from a predetermined flight attitude. For this purpose I have provided a conventional rate gyro 10 which is responsive to the rate of turn of the craft about its normal vertical axis. Such a rate gyroscope may take the form of that shown in Reissue Patent No. Re. 22,330, dated June 8, 1943, in the name of Charles S. Draper for a Turn Indicator. Another type of rate gyroscope which is compensated for bank angle error and which might be particularly adaptable to the present invention is that shown in copending application Serial No. 697,457, filed in the name of Walter Wrigley for Azimuthal Rate Gyroscopes and which matured into U. S. Patent No. 2,602,239 on July 8, 1952. Of course, it is to be understood that any type of inertial device responsive to rate of turn may be employed in my invention without departing from the scope thereof. For example, a vibratory rate responsive device such as shown in Reissue Patent No. Re. 22,409 dated December 21, 1943, in the name of Joseph Lyman et al. for Rate and Attitude Indicating Instruments may be employed.

Rate gyro 10 has mounted on the gimbal supporting or precession axis the movable contact arm or wiper 11 of a potentiometer 12. Upon precission of the gyro 10 due to turning of the craft about its normal vertical axis wiper 11 will be displaced in one direction or another from the center or neutral position of potentiometer winding 13 depending upon the direction of turn, to thereby produce in lead 14 a signal voltage proportional to the displacement of the wiper 11. Potentiometer winding 13 is energized from a grounded neutral D. C. supply line 15. The signal voltage appearing on lead 14 is proportional to the displacement of wiper 11 and therefore to the azimuthal rate of turn of the craft as determined by the amount and direction of precession of the rate gyroscope 10. This signal is applied to the summing circuit 7 by means of lead 14 as shown in the drawings.

A similar rate of turn signal is also derived from potentiometer 121. The wiper 111 of this potentiometer is operated by the rate gyro 10 in a manner similar to that described in connection with potentiometer 12. The winding 131 of potentiometer 121 is connected across the supply lines 15 and the wiper is connected by lead 141 to one terminal of the armature 16 of an integrating motor 17. Field 18 of motor 17 is connected across the supply lines 15 so that the motor will rotate in a direction and at a rate determined by the polarity and magnitude of the rate signal derived from potentiometer 121 and supplied thereto through lead 141. The second terminal of the armature of motor 17 is connected through lead 142 to ground. It will be observed that integrating motor 117 will operate in accordance with the signal supplied to the armature thereof and therefore in accordance with the rate of turn of the craft and when the rate of turn ceases, the rate signal having gone to zero, motor 17 will become stationary.

The rotational output of motor 17 is utilized, through worm and gear mechanism 20, to rotate the movable contact arm or wiper 21 of a potentiometer 22, the winding 23 of which is excited from the D. C. supply lines 15. Displacement of the wiper 21 from its neutral position will cause a signal voltage to appear on lead 24 which is proportional to the angular displacement of the craft from its initial flight attitude or heading, that is, to the time integral of the rate of turn signal on lead 14. This time integral signal is also applied to the summing circuit 7 to move the vertical indicating arm 2 of meter 1. A magnetic clutch 25 is provided in the output of the motor 17 to permit centering of the wiper 21 of potentiometer 22 when the circuit of the magnetic clutch is opened through switch 26, the purpose of which will be hereinafter more fully described. A viscous coupling 27 in the output of motor 17 is provided which permits spring centered wiper 21 of potentiometer 22 to slowly return to its center position, thereby providing an error corrector for correcting any errors in integration by motor 17. Such an error corrector is desirable, especially when flying a radio beam, since it will eliminate any residual errors.

The system of my invention is completely satisfactory with no other directional references than above described; however, a magnetic compass may, if desired, be added to the system. If such addition be made, the magnetic compass may be provided with a pick-off means such as any of the potentiometers shown in the drawings and may be settable to any desired course or heading and the output thereof may be applied to the integrating motor 17 as is the rate signal from rate gyro 10. In such a case, integrating motor 17 will integrate the compass signal to thereby provide a stable directional reference or heading signal to the meter 1.

The horizontal indicating arm of the meter 1 is actuated from signals derived in an exact similar manner as the vertical indicating arm 2. As shown in the drawing of Fig. 1, a rate gyro 30 is provided for determining the rate of turn of the craft in elevation or about a horizontal axis of the craft. Precession of rate gyro 30 causes a displacement of the wiper 31 of potentiometer 32 due to changes in pitch attitude of the craft. The winding 33 of potentiometer 32 is also excited from the grounded neutral D. C. supply line 15. The displacement of the wiper 31 is proportional to the rate of turn of the craft in elevation and therefore a signal voltage proportional to the displacement of the wiper 31 will appear on lead 34. Lead 34 is connected to the summing circuit 8 to supply thereto a signal proportional to the rate of turn of the craft in elevation. A second potentiometer 132 is also associated with the rate gyro 30 comprising the winding 133 which is connected across the supply lines 15 and a wiper 131 which is preferably operated by the rate gyro. This potentiometer like potentiometer 32 will provide a signal on wiper 131 or lead 341 connected thereto which is proportional to the rate of turn of the craft in elevation. The elevation rate signal appearing on lead 341 is applied to one terminal of the armature winding 36 of integrating motor 37, the other terminal being connected through lead 342 to ground, to thereby cause a rotation thereof proportional to the direction or polarity and magnitude of the pitch rate signal and the rotation will continue until the turn of the craft in pitch has ceased. The field 38 of motor 37 is energized from the D. C. supply line 15. The pitch rate of turn signal on lead 34 is applied directly to the summing circuit 8 and to the signal responsive device 6 of the meter 1. However, rate of change of pitch attitude may, in this case, be an unnecessary refinement and the horizontal arm 3 may be moved only by the displacement or integral signal appearing on lead 44 and thereby provide only a pitch attitude indication. For this purpose I have provided a switch 70, which is interposed in lead 34, and may be operated either to omit or cause the rate signal to be applied to meter 1. The rotational output of integrating motor 37 is utilized, through worm and gear mechanism 40, to rotate the wiper 41 of potentiometer 42. Potentiometer winding 43 is energized from grounded neutral D. C. supply line 15 and therefore displacement of the wiper 41 from the neutral position of winding 43 will cause a signal voltage to be impressed upon lead 44 which is proportional to the time integral of the pitch rate signal appearing on lead 34 and therefore proportional to the angular displacement of the craft in pitch from its initial flight attitude. This signal is applied through summing circuit 8 to the signal responsive means 6 to move the horizontal indicating arm 3 of meter 1. A magnetic clutch 45 and viscous coupling 47 are provided in the output of the pitch integrating motor 37 just as in the output of turn integrator motor 17. A switch 46 in the energizing circuit of the clutch 45 enables the pilot to change his pitch attitude, if desired, just as in the case of a change in heading more fully described below. The viscous coupling 47 provides an error corrector as does coupling 27.

The operation of the flight indicating system of my invention as thus far disclosed will now be described. Let us assume that we have attained a desired altitude and that we are proceeding on a particular desired course and heading. Considering movements of the craft only about the normally vertical axis thereof, let us assume that atmospheric turbulence or some other force has caused a turn of the craft from the desired heading. The rate gyro 10 will detect this turn causing a signal voltage proportional to the rate of the turn to appear on lead 14 through displacement of wiper 11 on winding 13 of potentiometer 12 of a magnitude and direction corresponding to the magnitude and direction of the precession of the gyro 10. Immediately, the vertical indicating arm 2 of the meter 1 will be deflected in response to the rate signal. At the same time armature 16 of integrating motor 17 is energized and will cause rotation thereof in a magnitude and direction corresponding to the magnitude and direction or polarity of the rate of turn signal. Motor 17 drives wiper 21 of potentiometer 22 and displaces it from its neutral or centered position on the winding 23 thereof and the signal voltage appearing on lead 24 therefore will be proportional to the time integral of the rate of turn signal, that is, will be proportional to the angular displacement of the craft from the desired heading. This integral signal is also applied to the meter 1 through summing circuit 7 to move the vertical indicating arm 2. This displacement of the arm 2 will continue to increase as long as the turn persists. The pilot, observing this displacement, will adjust the attitude of the craft to bring the arm 2 back to its central or zero position, that is, he will reverse the turn caused by atmospheric turbulence. Thus, this may leave the craft with a heading error but in a turn in a direction to reduce the heading error and the vertical pointer 2 may be in its centered or "zero" position. As the heading error is reduced by opposite rotation of integrating motor 17 (by the reverse or opposite polarity rate signal on lead 141), the original heading error will begin to be reduced thus causing an unbalance between the displacement signal from potentiometer 22 and the rate signal from potentiometer 13. Therefore, in order to maintain the indicating arm 2 at the reference position 4 it will be necessary for the pilot to reduce the rate of reverse turn so that it just balances the diminishing displacement signal. By such reduction, a smooth, asymptotic approach to the original heading results.

If for any reason the pilot wishes to change his course and heading he does so conveniently by referring to the craft's magnetic compass, or he may employ a rate of turn indicator and a time measurement. Of course, in turning the craft to the desired new heading the indicating arm 2 will be displaced just as in the case of the turn caused by air turbulence. Therefore, when he obtains the desired new heading he must re-center the vertical indicating arm 2 of the cross-pointer meter 1 so that when additional turns from the new heading occur they may be detected. This he does conveniently by opening the switch 26 thereby releasing magnetic clutch 25 on the integrating motor output shaft. Centering springs associated with potentiometer wiper 21 return it to its neutral position on potentiometer winding 23 thereby zeroing the displacement signal appearing on lead 24 causing indicating arm 2 to return immediately to its centered or zero position.

The horizontal indicating arm 3 of cross-pointer meter 1 is deflected in the same manner as the vertical indicating arm 2 and repetition of a detailed description of the operation thereof will be omitted.

However, in addition to the rate and displacement control of the horizontal indicating arm 3 of meter 1 there is provided a further control consisting of a signal voltage proportional to departure of the craft from a predetermined altitude. To accomplish this I have shown an altimeter 50 of conventional construction whose output rotates shaft 51 proportional to departure of the craft from a predetermined altitude. Shaft 51 has fixed at one end thereof the wiper 52 of a potentiometer 53 whose winding 54 is excited from a battery 90 having a center tap connected by lead 581 to one of the A terminals of a switch 60, hereinafter described. Any displacement of the wiper 52 on winding 54 by rotation of shaft 51 produces a D. C. signal proportional to the magnitude and direction of departure of the craft from the predetermined altitude. There is also provided means for establishing a reference altitude by providing zero signal voltage at the desired altitude. This means may comprise a magnetic clutch 56 which is in engaged position when excited from line 15 through the closure of a switch 57. The output of the altimeter control appears as a signal voltage across leads 58 and 581 and is applied to the summing circuit 8 to thereby move the indicating arm 3 of meter 1.

It may be desirable to omit the rate of change of pitch signal from the meter 1. For this purpose I have included a switch 70 in the lead 34. In the open position of switch 70, the horizontal needle 3 will be displaced by an integral or pitch displacement signal alone, or, a pitch signal plus an altitude or radio signal.

In operation of the altitude control, the pilot opens switch 57 thereby disengaging clutch 56 from altimeter control which centralizes wiper 52 on winding 54 through suitable centralizing springs. When the desired altitude has been attained the pilot closes switch 57 thereby engaging clutch 56. Hence, any departure of the craft from the selected altitude will reflect in movement of wiper 52 relative to winding 54 to thereby produce in lead 58 a signal voltage proportional to the magnitude and direction of said departure. This causes a vertical displacement of indicating arm 3 to indicate to the pilot a need for correcting craft's attitude to re-center or zero indicating arm 3.

A selector switch 60 is provided to introduce additional signals to the meter 1. In position A the vertical pointer 2 of meter 1 is controlled only from the rate and displacement signals above described and horizontal indicating arm 3 is controlled only from the rate (if desired) and displacements signals above described and with the altitude signal in addition thereto, if desired.

The above description applies to utilizing the indicating instrument of my invention only in cross country flight without reference to any predetermined ground track. However, the instrument is also particularly adapted for use with reference to a course determined by a radio directional reference such as the above-mentioned V. H. F. radio ranges and it is especially advantageous in enabling a pilot to maneuver his craft successfully and easily to bring it to an airport landing strip under most adverse weather conditions through an I. L. S. type of radio system.

If the indicating instrument of my invention is to be used with a V. H. F. radio range, switch 60 is thrown to position B. This causes an additional signal to be impressed by leads 64 and leads 65 on summing circuit 7 to additionally move vertical indicating arm 2 in accordance with the output of a V. H. F. radio range receiver 61.

If the pilot desires to maneuver his craft to bring it to an airport landing strip through use of an I. L. S. radio system, he throws switch 60 to position C. With switch 60 in this position a signal voltage proportional to craft displacement from a localizer radio landing beam is applied by leads 65 and leads 66 to summing circuit 7 to thereby additionally move vertical indicating arm 2 of meter 1. This signal voltage is derived across leads 66 from localizer receiver 62. The horizontal indicating arm 3 is controlled in a similar manner. With switch 60 in position C a signal voltage proportional to craft displacement from the glide path radio landing beam is derived across leads 67 and impressed by leads 68 upon summing circuit 8 to additionally move horizontal indicating arm 3 of meter 1, said signal voltage being supplied from glide path receiver 63.

The operation of the indicating instrument of my invention when used in conjunction with a ground course determining means, such as a radio directional reference, will now be described. In describing the operation, reference to Fig. 2 of the drawings will greatly aid in the understanding thereof. Let us assume that the pilot is flying the craft along a predetermined ground track T at a particular heading. Let us also consider only azimuthal movement of the craft with reference to, let us say, a localizer radio landing beam. At point A the indicating arm 2 of meter 1 is coincident with reference position 4. Suppose now that atmospheric turbulence or some other force causes the craft to be turned away from the ground track T to the right. This turn will be detected by rate gyro 10 and will produce a rate signal on lead 14 of a magnitude and direction or polarity corresponding to the magnitude and direction of the turn. This rate signal will cause the vertical indicating arm 2 of meter 1 to be displaced to the left of reference position 4. At the same time, however, integrating motor 17 will produce through potentiometer 22 a displacement or heading signal corresponding to the rate of turn signal which is also applied to meter 1 tending to cause a further displacement of arm 2 to the left. During the turn the craft has been displaced from the ground track T and a signal from the localizer receiver will tend to cause a still further displacement of the arm 2 from its centered or zero position. Therefore at point A' the three signals, rate of turn signal, a heading signal, and a localizer signal are additive, that is, are in the same direction, and they combine to move indicating arm 2 to the left. But suppose that at point B on the curve the turn caused by air turbulence ceases. Under these conditions only a heading signal and a localizer signal will operate the indicating arm 2 of meter 1, the rate of turn signal having gone to zero, through centering of wiper 11 of potentiometer 12 to its neutral position on the winding 13. Since wiper 111 of potentiometer 131 will also be centered, the signal on lead 141 will be zero and integrating motor 17 will cease to operate. However, during the right turn caused by air turbulence integrating motor 17 has caused wiper 21 to be displaced, let us say, downwardly from its neutral position on winding 23. This leaves the craft with a heading error and a localizer displacement error, and, in order to center the indicating arm 2, a corrective turn is required. This corrective turn will be a turn to the left. In other words, the pilot, in viewing the indicating arm, maneuvers the craft to follow movements of the arm. For example, if, as in the case just described, the indicating arm 2 moves to the left, the pilot will follow this movement and fly his craft to the left. Accordingly, in order to center or "zero" the indicating arm 2, the pilot institutes a reverse or left turn which is in an opposite sense to the turn caused by the air turbulence and the indicating arm will be centered when the rate of the reverse turn equals the heading error signal and the localizer error signal. Immediately, integrating motor 17 begins to drive in the opposite direction to reduce the heading signal caused by the original turn; that is, the wiper 21 of potentiometer 22 will be driven upwardly toward its neutral position on winding 23. Therefore, at point C on the curve the signals to the indicating arm 2 are a reverse rate of turn signal plus a diminishing heading signal plus an increasing localizer signal and the rate of the reverse turn signal will balance the heading signal and the localizer signal until point D on the curve is reached. At point D on the curve, the heading signal has decreased to zero and the localizer signal has become greater so that the pilot, in order to keep the indicating arm centered or at its "zero" position, must continue the left turn which turn signal will balance the localizer signal. However, by continuing the left turn integrating motor 17 will continue to rotate and drive wiper 21 of potentiometer 22 further upward and past its neutral position on winding 23 so that at point E on the curve the three signals cooperating to move the indicating arm are a reverse rate of turn, an increasing heading signal, and a decreasing localizer signal. It will be seen that the integrating motor 17 and therefore potentiometer 22 has produced displacement signals proportional to the sum of all turning movements of the craft during its departure from the ground track T.

At point F on the curve the corrective rate of turn signal has been reduced to zero but the localizer signal alone tends to indicate a "fly left" attitude, and the heading signal taken alone tends to indicate a "fly right" attitude so that the latter two signals will exactly balance and thereby produce zero deflection of indicating arm 2. If the turn were continued without reference to the indicator or meter 1, the craft would intercept the ground track T at some point G. But since the heading signal is still present and the localizer signal is decreasing, the heading signal will cause the indicating arm 2 to move to the right of reference position 4 so that in order to maintain it in its centered or "zero" position, the pilot must institute a right turn to reduce the heading signal. This right turn will gradually reduce the heading signal to zero by rotating wiper 21, through the action of motor 17, downwardly towards its neutral position on winding 23. As the pilot continues the right turn, both localizer signal and heading signal will gradually reduce and as they both become smaller and smaller the pilot must reduce the right turn so that the right turn signal will balance the difference between the localizer and heading signals to thereby maintain the indicating arm 2 of meter 1 in its centered position. In this manner an asymptotic approach to the ground track T will result without overshoot or hunting.

The horizontal indicating arm 3 is deflected in the same manner as the vertical indicating arm and correction of the attitude of the craft will be identical and repetition of a detailed description of the operation thereof is unnecessary and will therefore be omitted.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. A visual flying aid for manually piloted aircraft comprising an indicator having a reference index, a moveable indicating member and actuating means therefor, angular rate-of-turn-responsive means for providing a signal proportional to the angular rate of turn of said craft about an axis thereof from a predetermined attitude, means for integrating said rate of turn signal to thereby provide a signal proportional to the angular displacement of said craft from said predetermined attitude, means for algebraically combining said rate and displacement signals, and means for supplying the resultant signal to said actuating means.

2. A visual flying aid for manually piloted aircraft comprising an indicator having a reference index, a moveable indicating member and actuating means connected to said member for moving it to the right and left of said reference index, angular rate-of-turn-responsive means for providing a signal proportional to the angular rate of turn of said craft in azimuth from a predetermined heading, means for integrating said rate of turn signal to thereby provide a signal proportional to the angular displacement of said craft in azimuth from said predetermined flight attitude, means for algebraically combining said rate and displacement signals, and means for supplying the resultant signal to said actuating means.

3. A visual flying aid for manually piloted aircraft comprising an indicator having a reference index, a movable indicating member and actuating means connected to said member for moving it above or below said reference index, angular rate-of-turn-responsive means for providing a signal proportional to the angular rate of turn of said craft in pitch from a predetermined attitude, means for integrating said rate of turn signal to thereby provide a signal proportional to the angular displacement of said craft in pitch from said predetermined flight attitude, means for algebraically combining said rate and displacement signals, and means for supplying the resultant signal to said actuating means.

4. A visual flying aid for manually piloted aircraft comprising an indicator having a reference index and a pair of indicating members adapted cooperatively to form a symmetrical pattern in the field of view of said meter under correct flight attitude conditions of the craft, first and second signal responsive means operatively connected respectively to each of said members for moving one of said members to the right or left of said reference index and the other of said members above or below said reference index, angular rate-of-turn-responsive means for providing a signal proportional to the angular rate of turn of said craft in azimuth from a predetermined flight attitude, means for integrating said rate of turn signal to thereby provide a signal proportional to the angular displacement of said craft in azimuth from said predetermined flight attitude, means for algebraically combining said azimuth rate and azimuth displacement signals, means for supplying said combined signals to the first of said signal responsive means, angular rate-of-turn-responsive means for providing a signal proportional to the angular rate of turn of said craft in pitch from a predetermined flight attitude, means for integrating said rate of turn signal to thereby provide a signal proportional to the angular displacement of said craft in pitch from said predetermined flight attitude, means for algebraically combining said pitch rate and pitch displacement signals, and means for supplying said combined signals to the second of said signal responsive means.

5. A visual flying aid for manually piloted aircraft comprising an indicator having a reference index, a movable indicating member associated with said index and actuating means therefor, radio means including a receiver on said craft for supplying signals corresponding to lateral craft displacement from a predetermined radio flight path, means for providing a signal corresponding to the angular rate of turn of said craft from a predetermined attitude, means for integrating said rate of turn signal to thereby provide a signal corresponding to the angular displacement of said craft from said predetermined attitude, means for algebraically combining said radio, rate and displacement signals, and means for supplying the resultant signal to said actuating means.

6. A visual flying aid for manually piloted aircraft comprising an indicator having a reference index on the face thereof, a movable indicating member and actuating means therefor for moving it to the right or left of said reference index, radio means including a receiver for providing a signal corresponding to displacement of said craft from a flight path determined by a localizer radio beam, means for providing a signal corresponding to the angular rate of turn of said craft from a predetermined heading, means for integrating said rate of turn signal to thereby provide a signal corresponding to the angular displacement of said craft from said predetermined heading, means for algebraically combining said localizer, rate and displacement signals, and means for supplying the resultant signal to said signal responsive means.

7. A visual flying aid for manually piloted aircraft comprising an indicator having a reference index on the face thereof, a movable indicating member and actuating means operatively connected to said indicating member for moving it above or below said reference index, radio means including a receiver for providing a signal corresponding to the displacement of said craft from a flight path determined by a glide-path radio beam, means for providing a signal corresponding to the angular rate of turn of said craft in pitch from a predetermined attitude, means for integrating said rate of turn signal to thereby provide a signal corresponding to the angular displacement of said craft in pitch from a predetermined attitude, means for algebraically combining said radio, rate and displacement signals, and means for supplying the resultant signals to said actuating means.

8. A visual flying aid for manually piloted aircraft comprising an indicator having a reference index and a pair of perpendicularly disposed arms adapted cooperatively to form a symmetrical pattern in the field of view of said meter under correct flight attitude conditions of the craft, first and second signal responsive means operatively connected respectively to each of said indicating arms for moving one of said arms to the right or left of said reference index and the other of said arms above or below said reference index, first radio means including a receiver for providing a signal corresponding to the displacement of said craft from a flight path determined by a localizer radio beam, means for providing a signal corresponding to the angular rate of turn of said craft in azimuth from a predetermined heading, means for integrating said rate of turn signal to thereby provide a signal corresponding to the angular displacement of said craft from said predetermined heading, means for algebraically combining said first radio, azimuth rate and azimuth displacements signals, means for supplying the resultant signals to said first signal responsive means, second radio means including a receiver for providing a signal corresponding to displacement of said craft from a flight path determined by a glide path radio beam, means for providing a signal corresponding to the angular rate of turn of said craft in pitch from a predetermined attitude, means for integrating said rate of turn signal to thereby provide a signal corresponding to the angular displacement of said craft in pitch from said predetermined attitude, means for algebraically combining said second radio, pitch rate and pitch displacement signals, and means for supplying the resultant signal to said second signal responsive means.

9. A visual flying aid for manually piloted aircraft comprising an indicator having a reference index, a moveable indicating member associated with said index and actuating means therefor, radio means including a receiver on said craft for supplying signals corresponding to lateral craft displacement from a predetermined radio flight path, means for providing a signal corresponding to the angular rate of turn of said craft from a predetermined attitude, a motor having a control winding thereof connected to receive said rate of turn signal to thereby provide a signal corresponding to the angular displacement of said craft from said predetermined attitude, means for algebraically combining said radio, rate, and displacement signals, and means for supplying the resultant signal to said actuating means.

10. A visual flying aid for manually piloted aircraft comprising an indicator having a reference index, a moveable indicating member associated with said index and actuating means therefor, radio means including a receiver on said craft for supplying signals corresponding to lateral craft displacement from a predetermined radio flight path, a rate of turn gyro for measuring the angular rate of turn of said craft from a predetermined attitude, signal generating means coupled with said rate of turn gyro for providing a signal corresponding to said rate of turn measurement, means for integrating said rate of turn signal to thereby provide a signal corresponding to the angular displacement of said craft from said predetermined attitude, means for algebraically combining said radio, rate and displacement signals, and means for supplying the resultant signal to said actuating means.

11. A visual flying aid for manually piloted aircraft comprising an indicator having a reference index, a moveable indicating member associated with said index and actuating means therefor, radio means including a receiver on said craft for supplying signals corresponding to lateral craft displacement from a predetermined radio flight path, a rate of turn gyro for measuring the angular rate of turn of said craft from a predetermined attitude, signal generating means coupled with said rate of turn gyro for providing a signal corresponding to said rate of turn measurement, an integrating motor having a control winding thereof connected to receive said rate of turn signal to thereby provide a signal corresponding to the angular displacement of said craft from said predetermined attitude, means for algebraically combining said radio, rate and displacement signals, and means for supplying the resultant signal to said actuating means.

12. A visual flying aid for manually piloted aircraft comprising an indicator having a reference index, a moveable indicating member and actuating means therefor, angular rate-of-turn-responsive means for providing a signal proportional to the angular rate of turn of said craft from a predetermined attitude, an integrating motor having its control winding connected to receive said rate of turn signal, means controlled by said motor for producing a signal proportional to the angular displacement of said craft from said predetermined attitude, means for algebraically combining said rate and displacement signals, and means for supplying the resultant signal to said actuating means.

13. A visual flying aid for manually piloted aircraft comprising an indicator having a reference index, a moveable indicating member and actuating means therefor, angular rate-of-turn-responsive means for providing a signal proportional to the angular rate of turn of said craft from a predetermined heading, means for integrating said rate of turn signal to thereby provide a signal proportional to the angular displacement of said craft from said predetermined heading, means for zeroing the integration signal proportional to said displacement whereby the displacement from a former heading may be eliminated when a new desired heading is attained, means for algebraically combining said rate and displacement signals, and means for supplying the resultant signal to said actuating means.

14. A visual flying aid for manually piloted aircraft comprising an indicator having a reference index, a moveable indicating member adapted to coincide with said index and actuating means operatively connected to said indicating member for moving said member relative to said reference index, angular rate-of-turn-responsive means for measuring the angular rate of turn of said craft about its major axes from a predetermined attitude, means coupled with said measuring means for providing a signal proportional to the rate of turn of said craft, motor means, means for controlling said motor in accordance with said rate of turn signal, and signal generating means driven by said motor for providing a signal proportional to the time integral of said rate of turn signal whereby to provide a signal corresponding to the angular displacement of said craft about said axis from said predetermined attitude, said signals being so supplied to said actuated means that the indications of the indicating member will reflect the sum of said signals during departure of said craft from and the difference of said signals during approach of said craft toward said predetermined attitude.

15. A visual flying aid for manually piloted aircraft as claimed in claim 14, in which said two indicator actuating signals are so related that said indicator is centralized both when said craft is on said predetermined heading and also when said craft is not on said heading but in an attitude which will return it to said predetermined heading.

16. A visual flying aid for manually piloted aircraft comprising an indicator having a reference index, a moveable indicating member adapted to coincide with said index, and actuating means operatively connected to said indicating member for moving said member to the right or left of said reference index, angular rate-of-turn-responsive means for measuring the rate of turn of said craft in azimuth from a predetermined heading, means coupled with said measuring means for providing a signal proportional to the rate of turn in azimuth of said craft, motor means, means for controlling said motor in accordance with said rate of turn signal, and signal-generating means driven by said motor means for providing a signal proportional to the angular displacement of said craft in azimuth from said predetermined heading, said signals being so supplied to said actuating means that the indications of the indicating member will reflect the sum of said signals during departure of said craft from and the difference of said signals during approach of said craft toward said predetermined attitude.

17. A visual flying aid for manually piloted aircraft as claimed in claim 16, in which said two indicator actuating signals are so related that said indicator is centralized both when said craft is in said predetermined attitude and also when said craft is not in said attitude but in an attitude which will return it to said predetermined attitude.

18. In a craft navigation instrument of the character described, a moveable indicator and actuating means therefor, said indicator being adapted to coincide with an index not only when the craft is on a prescribed ground track but also when the craft is off said track and oriented about its major axes to return the craft to said track, means for providing a first signal having a value dependent upon the magnitude and direction of displacement of the craft relative to said ground track, means for providing a second signal having a value dependent upon the rate of turn of said craft from a predetermined attitude, means for integrating said second signal to thereby provide a third signal having a value dependent upon the angular displacement of the craft from a predetermined attitude, and means for algebraically combining all of said signals, and means for supplying the resultant signal to said actuating means.

19. A visual flying aid for manually piloted aircraft comprising an indicator having a reference index, a moveable indicating member and actuating means therefor, angular rate-of-turn-responsive means for providing a signal proportional to the angular rate of turn of said craft from a predetermined attitude, means for integrating said rate-of-turn signal to thereby provide a signal proportional to the angular displacement of said craft from said predetermined attitude, means for zeroing the integration signal proportional to said displacement whereby the displacement from a former attitude may be eliminated when a new desired attitude is attained, means for algebraically combining said rate and displacement signals, and means for supplying the resultant signal to said actuating means.

20. A visual flying aid for manually piloted aircraft comprising an indicator having a reference index, a moveable indicating member and actuating means therefor, angular rate-of-turn-responsive means for providing a signal proportional to the angular rate of turn of said craft in pitch from a predetermined pitch attitude, means for integrating said rate of turn signal to thereby provide a signal proportional to the angular displacement in pitch of said craft from said predetermined pitch attitude, means for zeroing the integration signal proportional to said displacement whereby the displacement from a former pitch attitude may be eliminated when a new pitch attitude is attained, means for algebraically combining said rate and displacement signals, and means for supplying the resultant signal to said actuating means.

21. A visual flying aid for manually piloted aircraft comprising an indicator having a reference index, a moveable indicating member cooperable therewith and actuating means therefor, a rate of turn gyro for measuring the angular rate of turn of said craft from a predetermined attitude, signal generating means coupled with said rate of turn gyro for providing a signal proportional to the rate of turn of said craft, an integrating motor having its control winding connected to receive said rate of turn signal, means controlled by said motor for producing a signal corresponding to the angular displacement of said craft from said predetermined attitude, means for algebraically combining said rate and displacement signals, and means for supplying the resultant signal to said actuating means.

22. A flying aid for aircraft comprising angular rate-of-turn-responsive means for providing a signal proportional to the angular rate of turn of said craft about an axis thereof, means for integrating said rate of turn signal to thereby provide a signal proportional to the angular displacement of said craft due to said angular rate of turn, and means for algebraically combining said signals.

23. A flying aid for aircraft comprising indicator means, angular rate-of-turn-responsive means for providing a signal proportional to the angular rate of turn of said craft about an axis thereof, means for integrating said rate of turn signal to thereby provide a signal proportional to the angular displacement of said craft due to said rate of turn, and means for controlling said indicator means in accordance with said signals.

24. A flying aid for aircraft comprising indicator means, angular rate-of-turn-responsive means for providing a signal proportional to the angular rate of turn of said craft about an axis thereof, means for integrating said rate of turn signal to thereby provide a signal proportional to the angular displacement of said craft due to said rate of turn, means for algebraically combining said rate and displacement signals, and means for supplying the resultant signal to said indicator means.

25. A flying aid for aircraft comprising radio receiver means for supplying a first signal corresponding to lateral displacement of the craft from a predetermined radio flight path, means for providing a second signal corresponding to the angular rate of turn of said craft, integrating means controlled by said second signal for providing a third signal corresponding to angular displacement of said craft due to said rate of turn, and means for algebraically combining said three signals.

26. A flying aid for aircraft comprising angular rate-of-turn-responsive means for providing a signal proportional to the angular rate of turn of said craft about an axis thereof, means for integrating said rate of turn signal to thereby provide a signal proportional to the angular displacement of said craft due to said angular rate of turn, means for algebraically combining said signals, and manually controlled means for reducing the signal output of said integrating means substantially to zero.

27. A flying aid for aircraft comprising radio receiver means for supplying a first signal corresponding to lateral displacement of the craft from a predetermined radio flight path, means for providing a second signal corresponding to the angular rate of turn of said craft, integrating means controlled by said second signal for providing a third signal corresponding to angular displacement of said craft due to said rate of turn, means for algebraically combining said three signals, and manually controlled means for reducing the signal output of said integrating means substantially to zero.

SPENCER KELLOGG 2ND.

References Cited in the file of this patent

UNITED STATES PATENTS

| Number | Name | Date |
|---|---|---|
| 1,436,280 | Minorsky | Nov. 21, 1922 |
| 1,703,317 | Minorsky | Feb. 26, 1929 |
| 2,372,185 | Wittkuhns | Mar. 27, 1945 |
| 2,482,809 | Thompson | Sept. 27, 1949 |

FOREIGN PATENTS

| Number | Country | Date |
|---|---|---|
| 516,567 | Great Britain | Jan. 5, 1940 |
| 934,544 | France | Jan. 19, 1948 |